United States Patent
Suzuki et al.

(10) Patent No.: US 8,085,735 B2
(45) Date of Patent: Dec. 27, 2011

(54) BASEBAND DEMODULATION ARCHITECTURE FOR ADAPTIVE MODULATION METHOD

(75) Inventors: May Suzuki, Koganei (JP); Kiyoshi Kawamoto, Yokohama (JP); Joichi Saito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1095 days.

(21) Appl. No.: 11/288,322

(22) Filed: Nov. 29, 2005

(65) Prior Publication Data
US 2006/0193290 A1 Aug. 31, 2006

(30) Foreign Application Priority Data
Feb. 18, 2005 (JP) ................... 2005-041530

(51) Int. Cl.
H04B 7/216 (2006.01)
(52) U.S. Cl. ........................................ 370/335; 375/340
(58) Field of Classification Search .................. 370/329, 370/331, 335
See application file for complete search history.

(56) References Cited

U.S. PATENT DOCUMENTS

| | | | | |
|---|---|---|---|---|
| 5,742,745 A * | 4/1998 | Sugikawa et al. | ............ | 358/1.15 |
| 5,949,772 A * | 9/1999 | Sugikawa et al. | ............. | 370/331 |
| 2002/0159384 A1 * | 10/2002 | Classon et al. | ................ | 370/216 |
| 2003/0081576 A1 * | 5/2003 | Kim et al. | ...................... | 370/335 |
| 2004/0042492 A1 * | 3/2004 | Suzuki et al. | ................. | 370/473 |
| 2005/0002444 A1 * | 1/2005 | Wei et al. | ....................... | 375/147 |
| 2005/0163200 A1 * | 7/2005 | Jonsson et al. | ................ | 375/148 |
| 2005/0182994 A1 * | 8/2005 | Ashikhmin et al. | .......... | 714/748 |
| 2006/0039282 A1 * | 2/2006 | Vasudevan et al. | ........... | 370/235 |
| 2006/0156166 A1 * | 7/2006 | Sarkar et al. | ................... | 714/749 |
| 2007/0189365 A1 * | 8/2007 | Olsson et al. | ................ | 375/148 |

OTHER PUBLICATIONS

3rd Generation Partnership Project 2 "3GPP2", 3GPP2 C.S0024-A, cdma200 High Rate Packet Data Air Interface Specification, Version 1.0, Mar. 2004.*

* cited by examiner

Primary Examiner — Rafael Pérez-Gutiérrez
Assistant Examiner — German Viana Di Prisco
(74) Attorney, Agent, or Firm — Stites & Harbison PLLC; Juan Carlos A. Marquez, Esq.

(57) ABSTRACT

A wireless communication device for a communication system including data channels and control channels is disclosed. This device includes a receive section for receiving signals including data signals sent over the data channels, and control signals sent over control channels, the control signal corresponding to the data signals, a control channel demodulator for demodulating the control signals indicating at least one of the packet size and modulation method, a memory for accumulating the receive signals during the demodulation of the control signals, and a data channel demodulator for loading the receive signal from the memory, and demodulating the data signal according to the indicated at least one of the packet size and modulation method determined based on the demodulated control signals.

6 Claims, 10 Drawing Sheets

FIG.2
(RELATED ART)

| PACKET SIZE (BIT/PACKET) | MODULATION TYPE AND WALSH COVER | PHASE COMPONENTS REQUIRED FOR DEMODULATION |
|---|---|---|
| 128,256,512,768, 1024 | BPSK, $W_2^4$ | Q PHASE OF $W_2^4$ |
| 1536,2048 | QPSK, $W_2^4$ | I,Q PHASE OF $W_2^4$ |
| 3072,4096 | QPSK, $W_1^2$ | I,Q PHASE OF $W_1^2$ |
| 6144,8192 | QPSK, $W_1^2$ AND $W_2^4$ | I,Q,PHASE OF $W_1^2$ AND $W_2^4$ |
| 12288 | 8PSK, $W_1^2$ AND $W_2^4$ | I,Q,P* PHASE OF $W_1^2$ AND $W_2^4$ |

\* P PHASE COMPONENTS ARE ONLY REQUIRED FOR DEMODULATION OF 8PSK, AND IS DERIVED FROM THE FOLLOWING FORMULA:

$$P = \frac{(|I|-|Q|)}{\sqrt{2}}$$

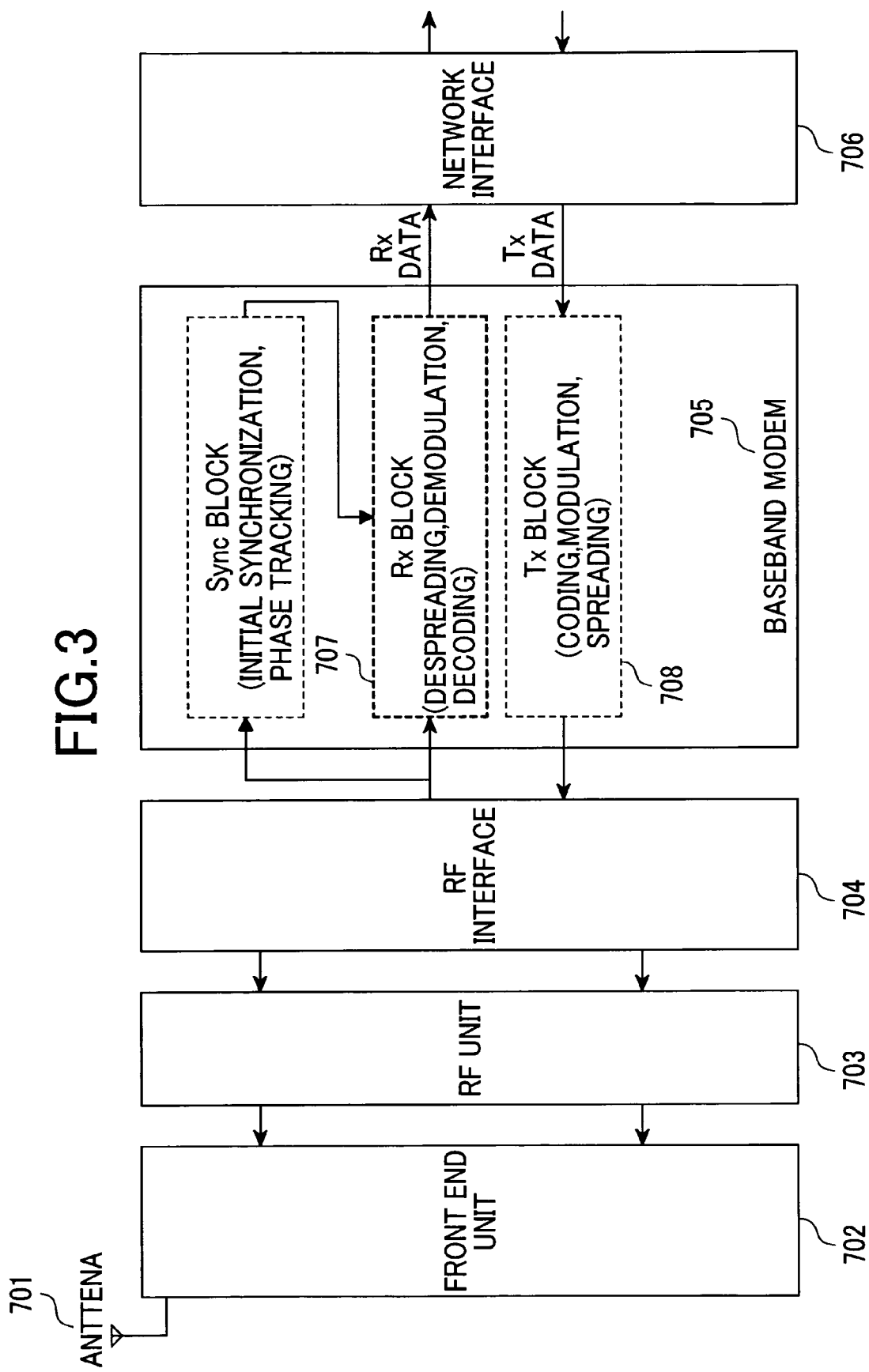

BASEBAND DEMODULATION ARCHITECTURE FOR ADAPTIVE MODULATION METHOD

CLAIM OF PRIORITY

The present application claims priority from Japanese application JP 2005-041530 filed on Feb. 18, 2005, the content of which is hereby incorporated by reference into this application.

FIELD OF THE INVENTION

The present invention relates to wireless communication systems such as for LAN or cellular telephone networks that contain a base station baseband modulation section. The present invention particularly is directed to wireless communication devices for wireless communication systems using CDMA (Code Division Multiple Access) system and H-ARQ (Hybrid Automatic Repeat Request) control.

BACKGROUND OF THE INVENTION

Wireless communication systems for cellular telephones in recent years must transmit many types of diverse information ranging from information with a comparatively small number of bits such as voice and written mail, to information with a large number of bits such as photos and movie files attached to mail and movie data for video telephony. To cope with this diversity, the system contains multiple bit rates and packet sizes to match the data quantity (number of bits) to be sent. Appropriate use of these bit rates and packet sizes increases the transmission efficiency. For example, the wireless communication standard cdma2000 1xEV-DO (Rev. A) established by the 3GPP2 standards project, contains twelve types of packet sizes over a wide range from 19.2 kbps to 1843.2 kbps for the reverse link traffic channel. The demodulation methods are a combination of BPSK, QPSK, or 8PSK modulation and Walsh coding, and a total of five modulation methods are used according to the packet size. FIG. 2 shows the combinations of packet size, modulation method, as well as component combinations required for demodulation. As can be seen in the table, there are two types of Walsh codes, namely $W_2^4$ and $W_1^2$. When the packet size is 4096 bits or less, either one of these code types can be utilized. When the packet size is 6144 bits or more, both types can be utilized.

The format for reverse link traffic channels for 1xEV-DO standards is described while referring to FIG. 1. Besides the data channel 101 used for transmitting the user data signal, the control channels such as the Pilot channel 102 and the RRI (Reverse Rate Indicator) channel 103 are CDMA (Code Division Multiple Access) multiplexed onto the same period in the packet of the reverse link traffic channel sent from the terminal. The Pilot channel 102 is utilized for synchronous tracking and for path search. The RRI channel 103 is used for sending an RRI signal to notify the base station of the data channel packet size sent by the terminal. The single subframe 104 is 6.66 milliseconds and the packets are sent in subframes. Also, Ack/Nack messages are exchanged by H-ARQ (Hybrid Automatic Repeat Requests) control between the terminal and base station after transmitting the packet on the reverse link on the data channel. If the base station did not receive the data channel packet Nack 105 is transmitted on the forward link traffic channel and the terminal re-sends the same data up to a maximum of three times. The base station stores the data during the retransmit period, accumulates the total demodulation results in the data which has been sent the previous time, and demodulates it again. However a single packet can only be sent every two sub-frames so that the data storage period at the base station when re-sending the data three times is 66.66 milliseconds (which is equal to 10 sub-frames) or more and therefore extremely long.

(1) In the 1xEV-DO standards, the RRI channel sends an RRI signal that is code multiplexed onto the data channel. Thus, the base station cannot know the packet size and modulation method until the RRI channel signal is decoded. In other words, the data channel cannot be decoded until the decoding of the RRI channel signal is completed.

(2) On the other hand, to implement H-ARQ control, the demodulated results on that data channel must be checked within one subframe, and the Ack/Nack must be sent on the forward link traffic channel. Thus, there are strict time limits on the data channel modulation.

(3) The required memory capacity of the base station is enlarged in order to store 10 subframes or more of data needed for H-ARQ control.

The above problem is not limited to 1xEV-DO standards but is a problem common in wireless communication standards using the CDMA system and standards that implement H-ARQ retransmission control such as 1xEV-DV standards. Such as when receiving the reverse link traffic channel as described, for example; however, the same concept applies to systems with the same type of RRI and retransmission problems on the forward link traffic channels, too.

SUMMARY OF THE INVENTION

According to an aspect of the present invention (1), the input data for the demodulator is stored in the memory until demodulated by the RRI channel, and the data channel is demodulated after the packet size and modulation method are determined from the demodulated results of the RRI channel; (2), data channel demodulation is performed in parallel with RRI channel demodulation and those results are stored in the memory, and after the packet size and modulation method are found, the results of data channel demodulation are subjected to selection and accumulation to obtain the final output; and (3), the pre-demodulated data is discarded in stages during the retransmission period. By storing only the total accumulated results after demodulation, the required memory capacity can be reduced.

The present invention provides a baseband demodulation circuit to resolve the problem that the data channel cannot be demodulated because the packet size and modulation method of the data are not known until the RRI channel is demodulated. The present invention accounts for the H-ARQ transmission by keeping the data processing delay within the time limit. It also avoids increasing the circuit operating speed and the memory capacity.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts:

FIG. 2 is a table showing the corresponding elements for data demodulation, the modulation method and the packet size specified in the 1xEV-DO (Rev. A) standards;

FIG. 3 is a block diagram showing the structure of a typical base station used in the wireless communication system;

DETAILED DESCRIPTION

Figure 1:
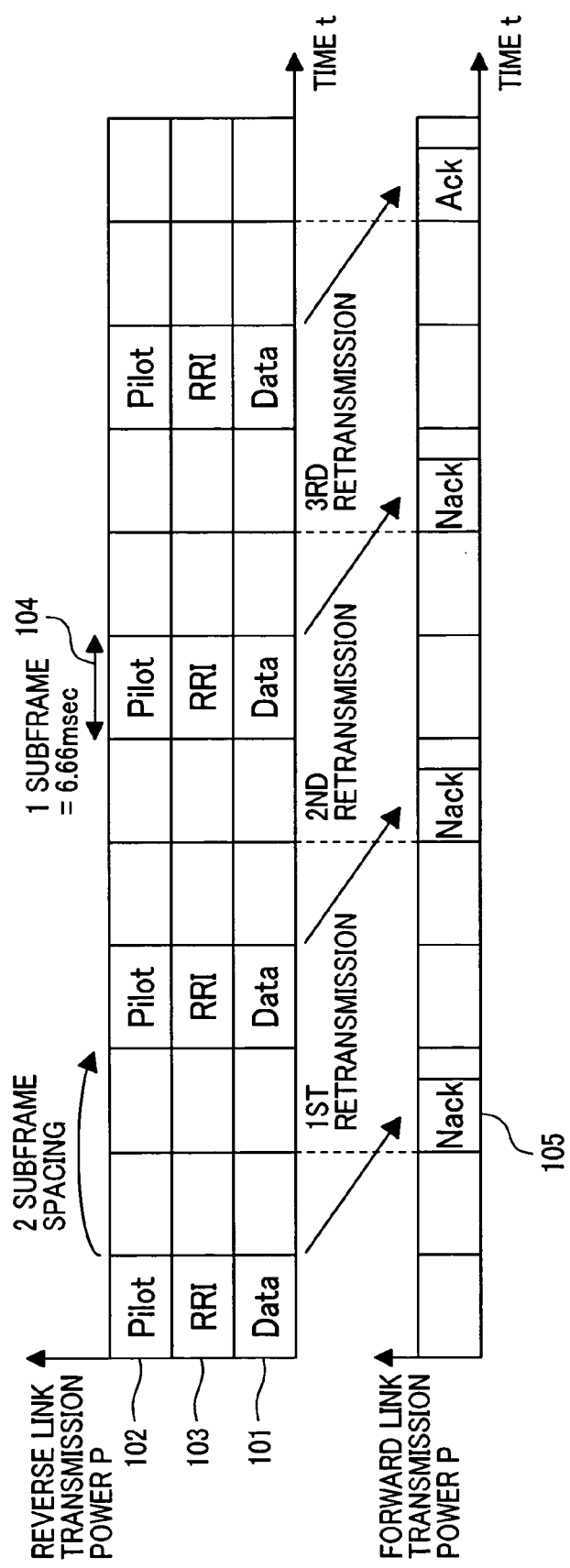
FIG. 1 is a table showing the H-ARQ retransmit control structure and the format for the reverse link channel specified in the 1xEV-DO (Rev. A) standards.

It is to be understood that the figures and descriptions of the present invention have been simplified to illustrate elements that are relevant for a clear understanding of the present invention, while eliminating, for the purpose of clarity, many other elements found in baseband demodulation architecture and methods dealing with the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The structure of a typical base station used in the wireless communication system is described while referring to FIG. 3. The antenna switch (or duplexer) within the front end unit 702 for switching the antenna between transmit and receive, passes the signal received from the antenna 701. After filtering, the frequency of the signal is then downconverted to baseband signals at the RF unit 703. The signal is then converted to a digital signal in the RF interface 704, and after initial synchronization in the synchronizing (synch) block of the baseband modem 705, is demodulated in the Rx block 707, and output to the network by the network interface 706. The transmit signal for transmission to a terminal is input to the baseband modem 705 from the network interface 706 and subjected to modulation processing such as error correction in the Tx (transmit) block 708. This transmit signal (or Tx data) is then converted to an analog signal by the RF interface 704, upconverted to RF signals of the desired frequency band in the RF unit 703, and after filtering in the front end unit 702, is transmitted from the antenna 701. Among the above described circuits, this invention relates in particular to the circuit configuration for the Rx (demodulation) block in the baseband modem.

Figure 4:
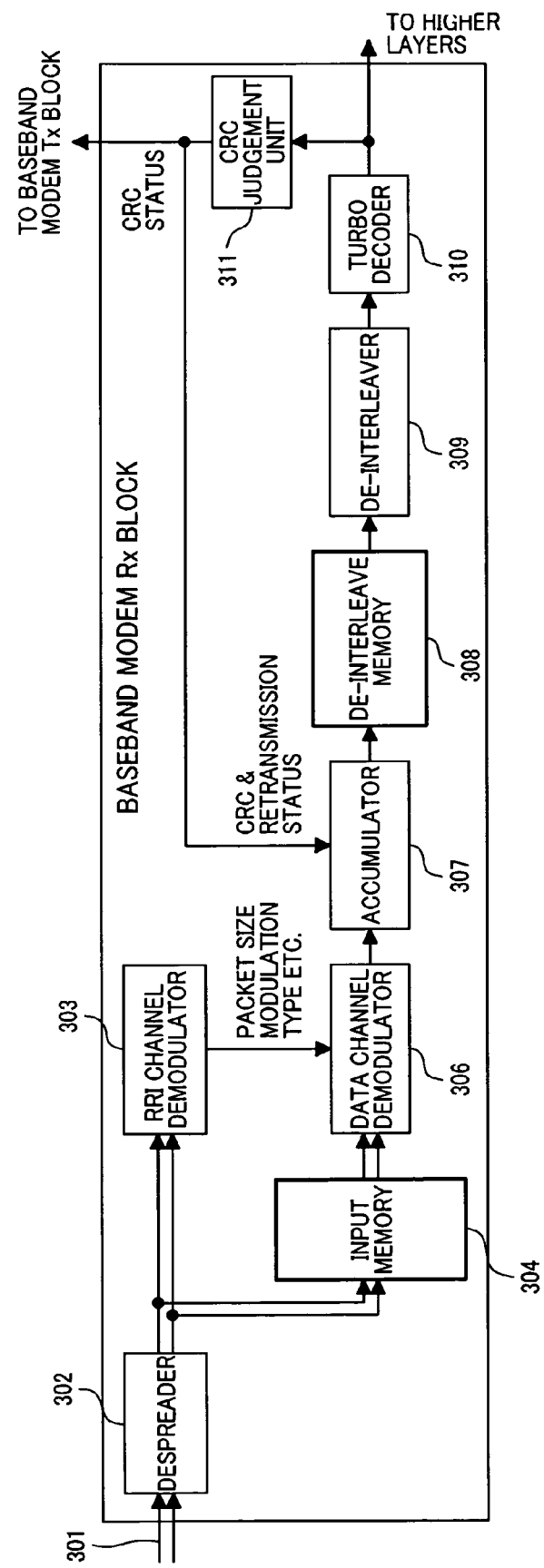
FIG. 4 is a block diagram showing a first configuration of the baseband modem block of this invention.

According to an aspect of the present invention, the baseband structure of this invention is described with reference to FIG. 4. In this embodiment, the Rx 8 (receive) data 301 input from the RF interface is branched after despreading in the despreader 302, and the data is written into the input memory 304 in parallel with demodulation of the RRI (signal) in the RRI channel demodulator 303. The data is written into different regions of the memory for each channel, and that data rate is equivalent to the CDMA chip rate (1.2288 MHz). After the RRI channel demodulation in the RRI channel demodulator 303 is completed after (1 subframe+processing delay α), the packet size and modulation method of the received packet are determined, and the data is loaded from the input memory 304 and demodulated based on the determined packet size and modulation method for that packet in the data channel demodulator 306. Repetitive symbols are next accumulated in the accumulator 307 and written into the deinterleave memory 308. De-interleaver 309 reads the data from the de-interleave memory 308 in a specified address pattern to rearrange the order of the data. This de-interleave (data rearrangement) can be performed either upon reading the data from the memory, or upon writing the data into the memory. Finally, turbo decoding is performed in the turbo decoder 310. The results from CRC judgment by the CRC judgment unit 311 are sent to the higher layer and to the transmit block. In the transmit block, the Ack/Nack for the terminal is sent on the forward link traffic channel based on the CRC judgment results. The data channel accumulator 307 is also notified of these CRC judgment results, and whether there is retransmission is decided based upon these results.

After writing onto the final address of the area assigned to each antenna, the input memory 304 overwrites the first address of this area with the next data in what is called a ring buffer format. The capacity will differ according to the structure proposed by the following three methods. The processing sequence in each method is described while referring to FIG. 5 through FIG. 7. Each method assumes one transmission and three retransmissions so the same data is received a total of four times.

Figure 5:
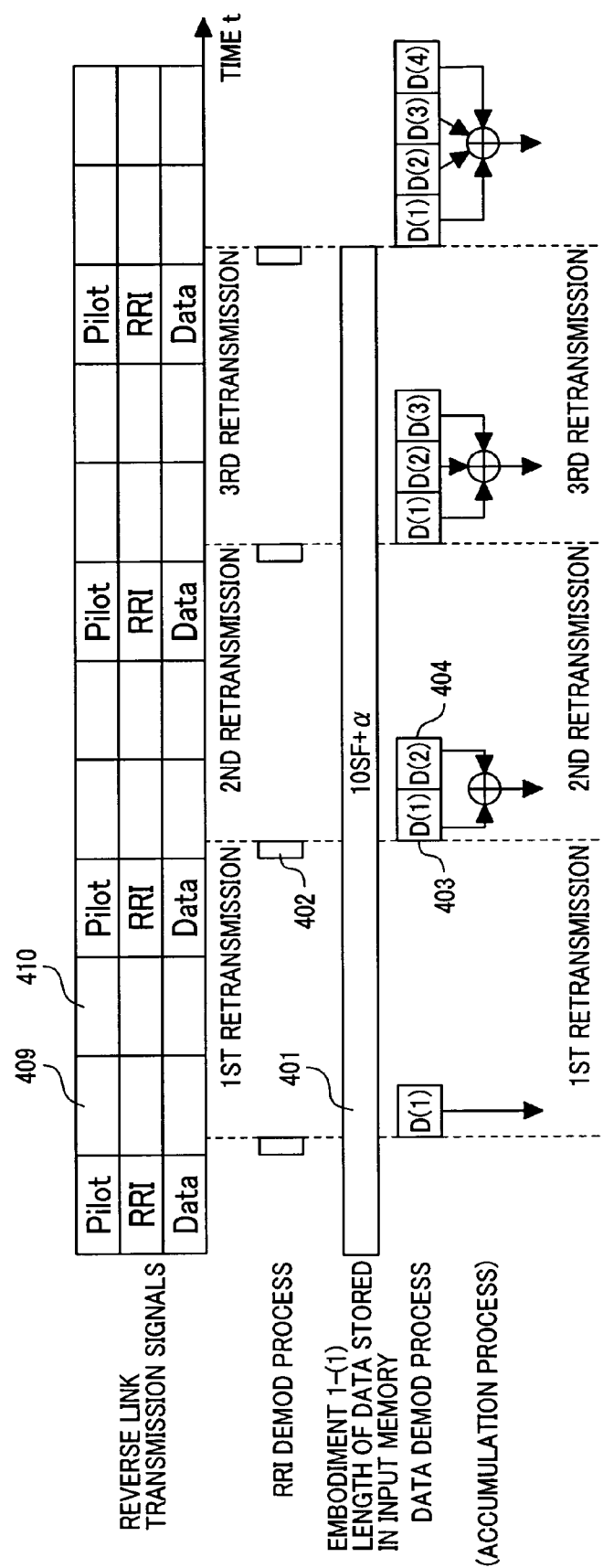
FIG. 5 is a chart showing the processing sequence according to an aspect of the present invention.

Method (a): Received data for the largest (10 subframes+processing delay α) period is stored in the input memories (304, 401) as shown in FIG. 5. When a retransmission occurs, the first received data and the re-transmitted received data are stored in the input memory 401. After completing the second retransmission in RRI demodulator 402, the received data at different receive timings is loaded from the input memory 401, and the data demodulator demodulates the first receive data 403 and the second receive data 404, and de-interleaving is performed after accumulating both of the demodulated data. Demodulation from the first received data is re-performed after RRI demodulation in the same way for the third and fourth times. The de-interleave memory is reset each time the retransmitted data is demodulated. In this method, the premodulated data is stored in the input memory so that demodulation can be re-performed from the first set of data even when there was an error in the RRI demodulation results, and a conflict occurs between judgment results for the first time and the second time. Thus the problem (1) can be resolved with high accuracy. However, the amount of data for demodulation grows larger as the number of retransmissions increases so that complying with the time limits of problem (2) is difficult. In addition, the memory capacity according to problem (3) becomes extremely large.

Figure 6:
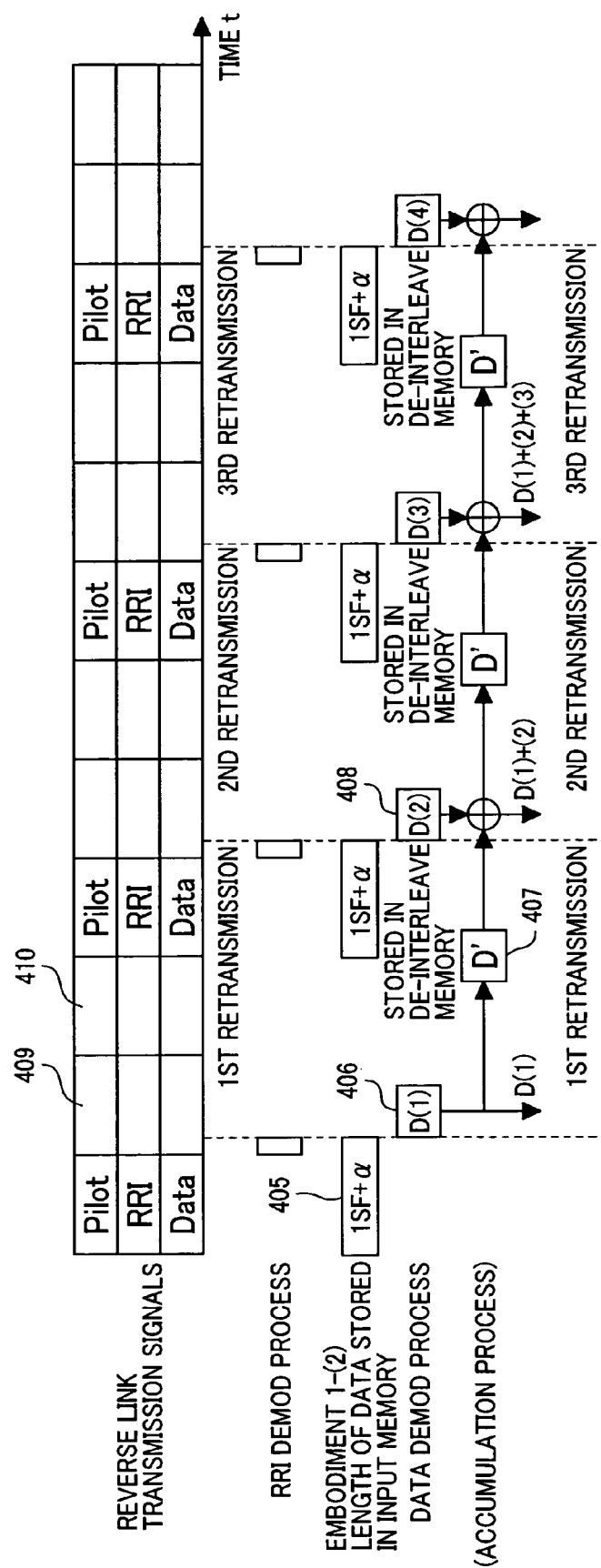
FIG. 6 is a chart showing the processing sequence according to an aspect of the present invention.

Method (b): Received data for the (1 subframe+processing delay α) period is stored in the input memories (304, 405) as shown in FIG. 6. The data demodulation results 406 are held in the de-interleave memory 407, and when a retransmission occurs, despreading and data demodulation 408 are performed, and accumulated with the contents (prior data demodulation results) of the de-interleave memory 407. The contents of the de-interleave memory are held until the retransmission is completed (10 subframes+processing delay β period), and data demodulation of the re-transmitted portion is performed for the third and fourth times, four times in the same way, accumulating with the contents of the de-interleave memory. The number of words per one channel of the de-interleave memory does not change even when the contents are accumulated. However since the data must also be held in the period (409 and 410) when the other packets are received, the de-interleave memory cannot be jointly used with other channels, and the total de-interleave memory capacity increases. Even though, compared to the receive data, the quantity of data per one subframe after demodulation is smaller (Quantity varies according to modulation method but is approximately ⅓rd to ¼th) so that the overall memory capacity can be reduced compared to the method (a) that stores long periods of received data in the input memory. In this method, the processing results are stored in the de-interleave memory, and re-transmitted data is accumulated so that re-performing the demodulation over again from the beginning is impossible, even when there was an error in the RRI demodulation. Therefore, the demodulation accuracy is poor compared to (a), but the amount of data demodulation processing can be kept low even if there are more retransmissions, and operation is easily performed within the time limits of problem (2). This method is also extremely effective in reducing memory capacity as discussed for problem (3).

Figure 7:
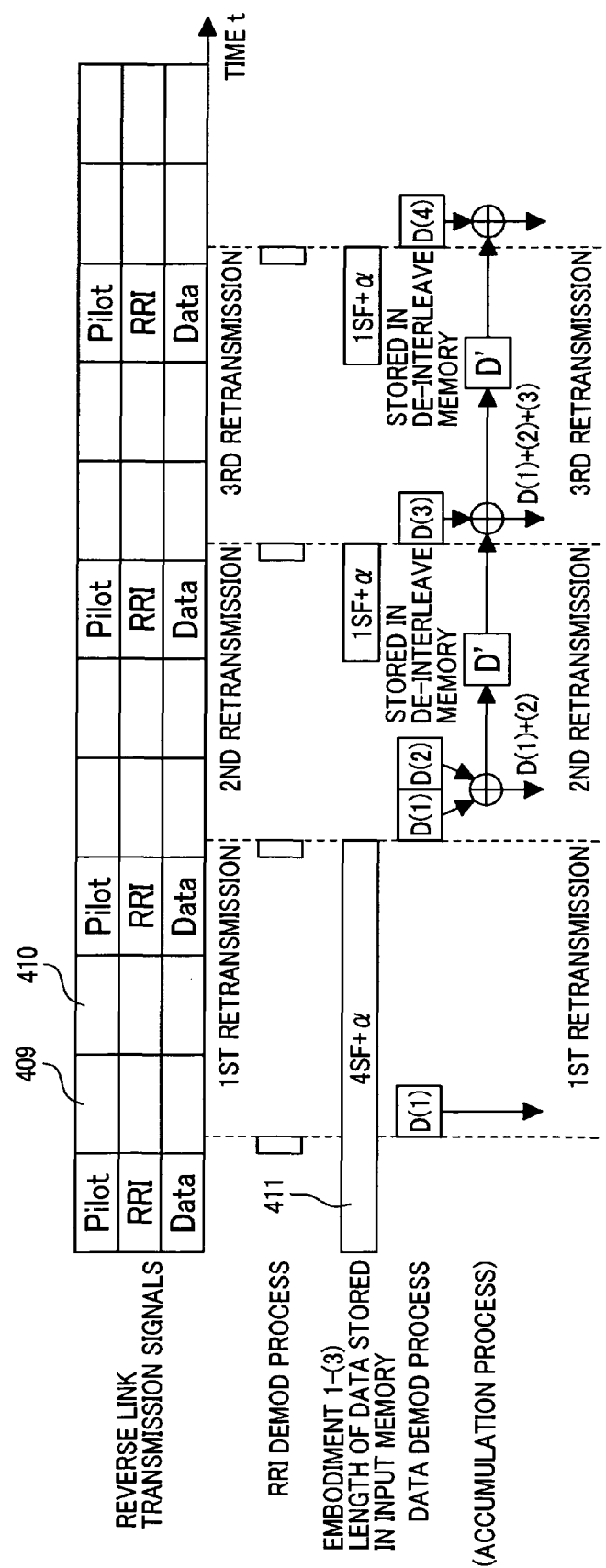
FIG. 7 is a chart showing the processing sequence according to an aspect of the present invention.

Method (c): Received data for the (4 subframes+processing delay α) period is stored in the input memories (304, 411) as shown in FIG. 7. By storing the input data until the end of the first retransmission, the first data demodulation portion can be re-performed when there is a conflict in the first and second RRI demodulation results. RRI essentially has strong transmission power compared to the data channel and is designed to be correctly demodulated even in areas where the ratio of signal power to noise power is low. In view of the fact that demodulation accuracy can be raised by also accumulating RRI demodulation results, a low RRI error rate can be predicted for the second and third retransmissions so from then onwards just the accumulation results are stored, and the input data discarded. This method represents a compromised solution as compared to (a) and (b) discussed hereinabove, and effectively resolves the problems of (2) and (3) while achieving high demodulation accuracy for the problem in (1).

Figure 8:
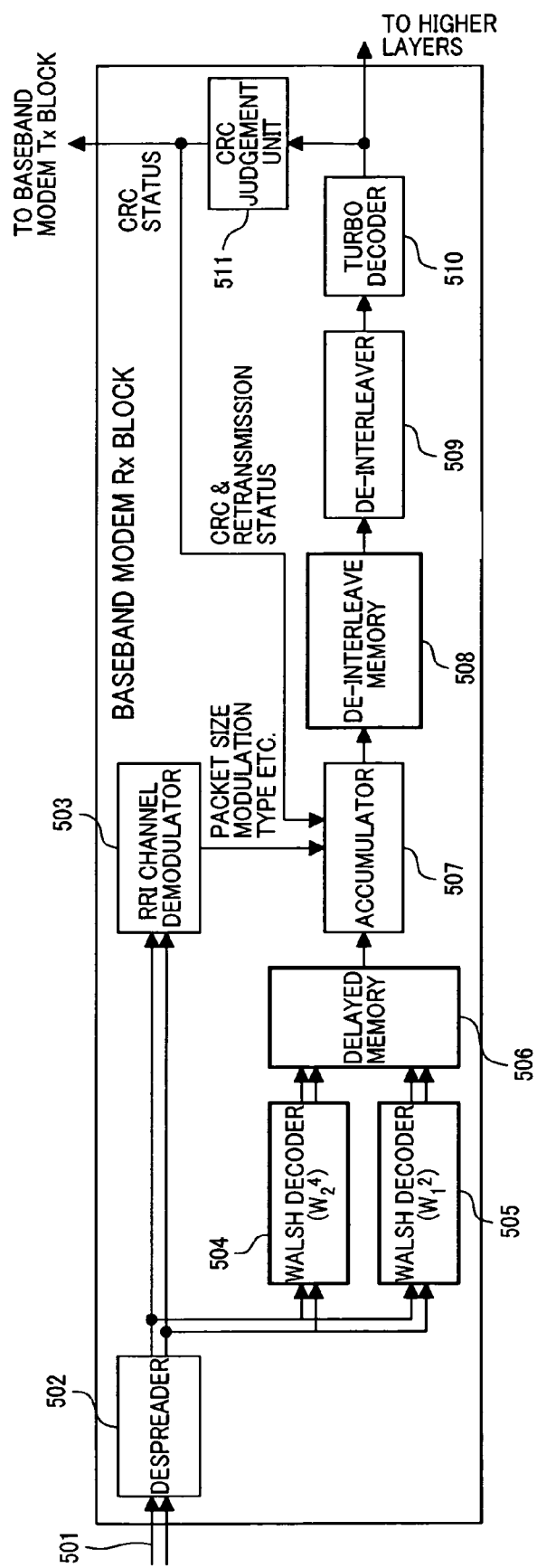
FIG. 8 is a block diagram showing a second configuration of the baseband modem block of this invention.

According to an aspect of the present invention, the baseband modem section of this invention is described while referring to FIG. 8. In the present embodiment, the Rx (receive) data 501 inputs from the RF interface branches at the despreader 502 and despreading is performed, along with RRI demodulation in the RRI demodulator 503. The Walsh decoder 504 respectively performs dual Walsh decoding for $W_2^4$ and by the Walsh decoder 505 for $W_1^2$ and the results stored in the delayed memory 506. As can be understood from examining the column on the right in FIG. 2, any of the modulation methods can be supported if I components and Q components are provided in the decoding results for $W_2^4$ and $W_1^2$. After completing demodulation of RRI by the RRI demodulator 503 after (1 subframe+delay α), the packet size and modulation method of the received packet are determined, and the information pre-stored in the accumulator 507 is referred to as in the table of FIG. 2 based on those parameter settings. The necessary components (for example, in the case of packet size 2048, just the I component and the Q component for $W_2^4$) are then loaded from the delayed memory 506, and after accumulating the repetitive symbols in the accumulator 507, which are written into the de-interleave memory 508. De-interleaver 509 reads the data from the de-interleave memory 508 in a specified address pattern to rearrange the order of the data. This de-interleave (data rearrangement) can be performed either upon reading the data from the memory, or upon writing the data into memory. Finally, turbo decoding is performed in the turbo decoder 510, and those results are sent to the higher layer and results from the CRC judgment block 511 are sent to the transmit block. The transmit block sends an Ack/Nack signal to the terminal on the forward link traffic channel based on the CRC judgment results. The accumulator 507 is also notified of the CRC judgment results and whether retransmission is needed is decided in this way.

After writing up to the final address of the area assigned to each channel, the delayed memory 506 overwrites the first address of this area with the next data in what is called a ring buffer format. After Walsh decoding the data rate becomes ½ to ¼th less compared to the data rate of the input memory of the first embodiment. The memory capacity is jointly used by all channels and is of the following two types. The processing sequence for each type is described while referring to FIG. 9 through FIG. 10. In either case, the retransmission is assumed to be performed three times, so the same data is received a total of four times.

Figure 9:
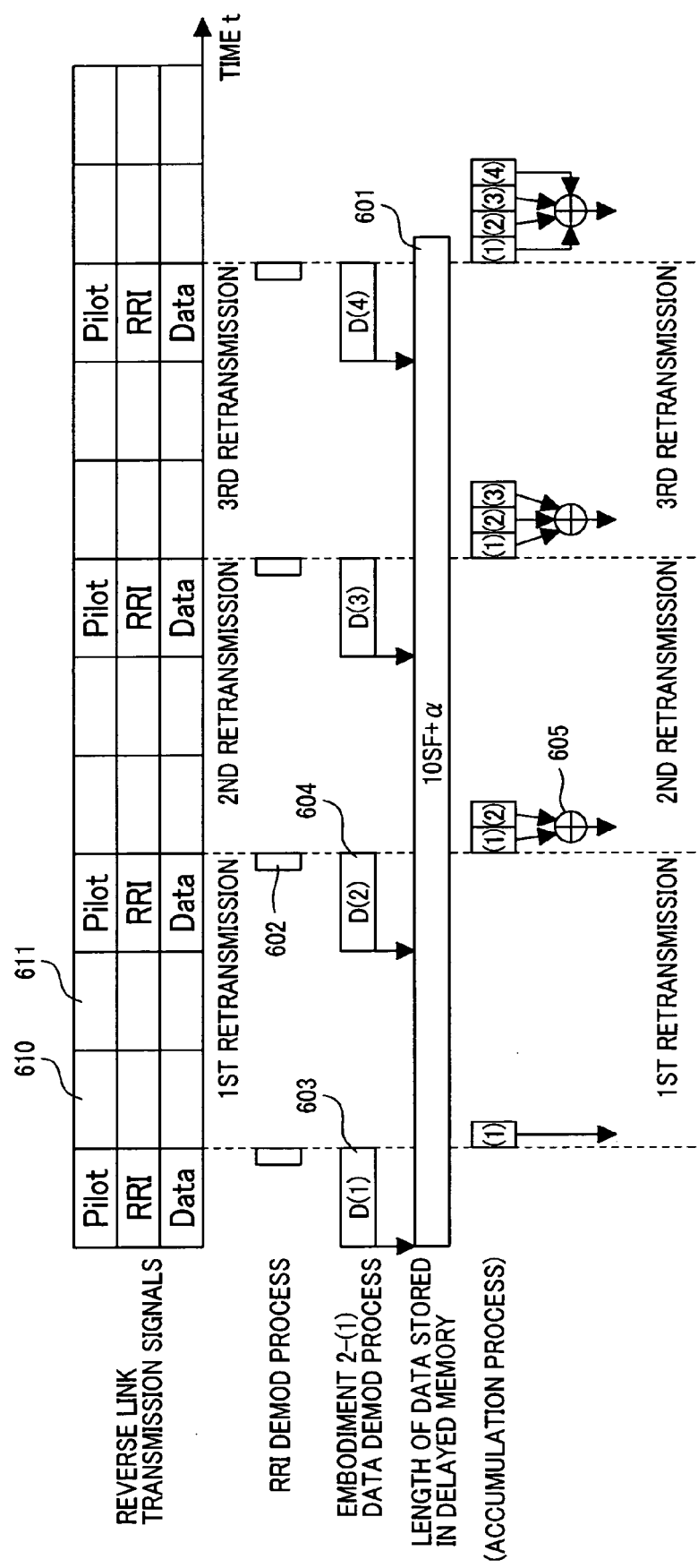
FIG. 9 is a chart showing the processing sequence according to an aspect of the present invention.

Method (d): Memory capacity to hold the Walsh decoding results for the (10 subframes+processing delay γ) period is stored in the delayed memory 601 as shown in FIG. 9. When a retransmission has occurred, and after the RRI demodulation 602 for the second retransmission, the required components from among the Walsh decoding results 603 for the first received data and the Walsh decoding results 604 for the second received data are loaded (read) from the delayed memory. The required components are accumulated in the accumulator 605, and de-interleaved. After RRI decoding in the same way for the third and fourth times, accumulation is re-performed starting from the Walsh decoding results for the first set of received data. The de-interleave memory is reset each time the transmitted data is demodulated. In order to allow handling of all modulation methods, in the method here, data from Walsh decoding is stored in the delayed memory so that demodulation can be re-performed from the first set of data even if there was an error in the RRI demodulation results causing a conflict between the pre-retransmit and post-retransmit judgment. Therefore the problem (1) can be resolved with high accuracy. However, the amount of data for demodulation grows larger as the number of retransmissions increases so that complying with the time limits of problem (2) is difficult (However, Walsh decoding is performed in parallel with RRI demodulation so that there is one subframe larger processing margin compared to the first method). The memory capacity for problem (3) also becomes large even though the capacity will be ½ to ¼th compared to (a) of the first method.

Figure 10:
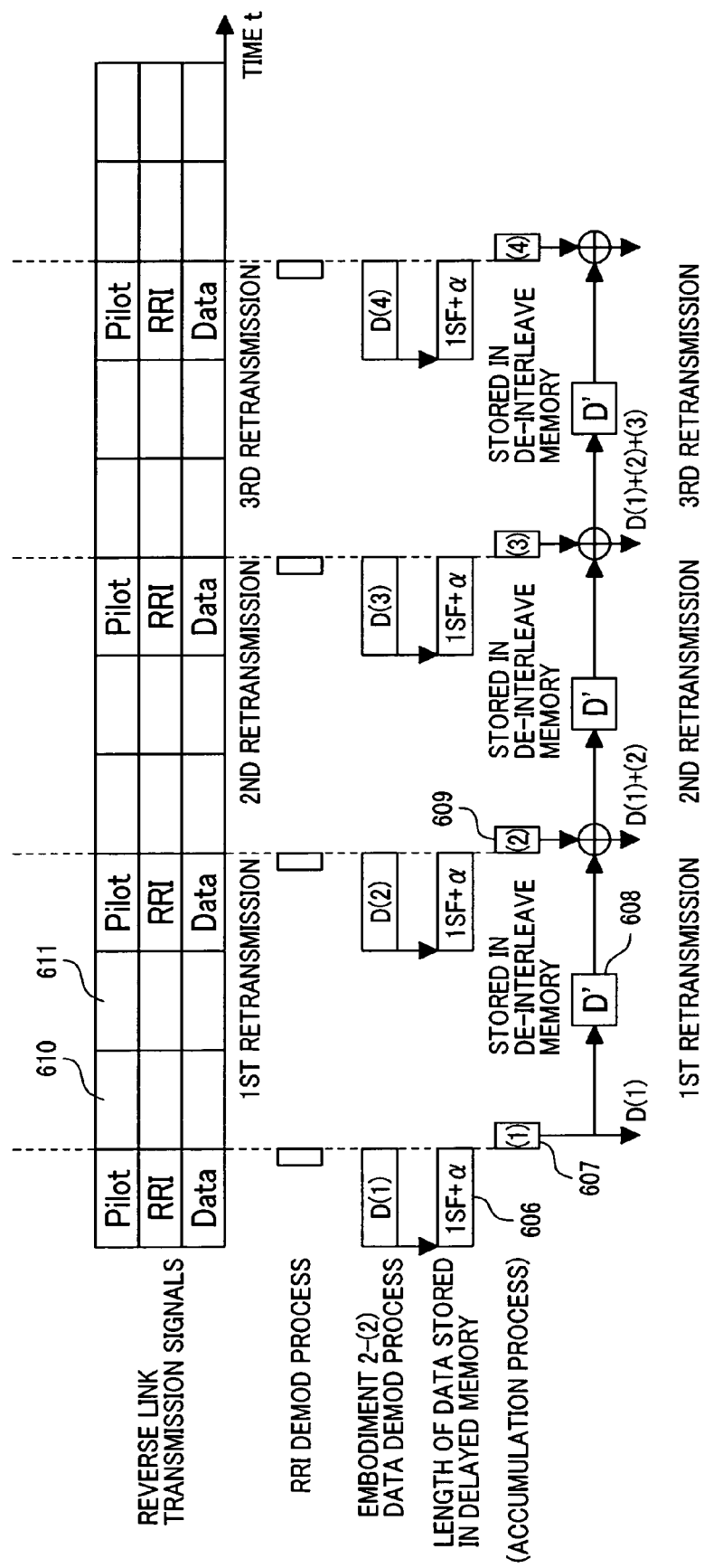
FIG. 10 is a chart showing the processing sequence according to an aspect of the present invention.

Method (e): Memory capacity to store the Walsh decoding results for the (1 subframe+processing delay α) period is prepared in the delayed memory 606 as shown in FIG. 10. The first received data demodulation results 607 are stored in the de-interleave memory 608, and when retransmission occurs, the data demodulation processing 609 is performed on the second set of received data, and are accumulated along with the contents of the de-interleave memory 608. The de-interleave memory contents are stored for the (10 subframes+processing delay β) period until retransmission is completed, and just the retransmit portions for the third and fourth times are demodulated and accumulated along with the contents of the de-interleave memory in the same way.

The number of words per one channel of the de-interleave memory does not change even when the contents are accumulated, however since the data must also be stored for the period (610 and 611) when the other channel packets are received, the de-interleave memory cannot be jointly used with other channels, and the total de-interleave memory capacity increases. However, storing only the data components required for demodulation on a channel where retransmission has occurred can reduce the overall (required) memory capacity compared to the method (d). In this method, the processing results are stored in the de-interleave memory, and the re-transmitted data is accumulated so that re-performing the demodulation over again from the beginning is impossible even if there was an error in the RRI demodulation. Therefore, even though the demodulation accuracy is poor compared to (d), the amount of data demodulation processing can be kept low when there are more retransmissions, and operation is easily performed within the time limits of problem (2). This method is also extremely effective in reducing memory capacity as discussed for problem (3).

A method (f) can also be utilized that stores the Walsh decoding results (4 subframes+processing delay α) in the delayed memory as a compromised solution for methods (d) (e) logically similar to that described hereinabove.

The above example described the case when receiving the reverse link traffic channel; however, the same concept applies to forward link channels in systems for performing retransmit control and giving notification of the packet size and modulation method by RRI.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A wireless communication device for a communication system including data channels and control channels, comprising:
   a receiver for receiving signals, the signals including data signals sent over the data channels and control signals sent over control channels, said control signals corresponding to said data signals;
   a control channel demodulator for demodulating said control signals indicating at least one of a packet size and a modulation method;
   a first memory for storing said received data signals during demodulation of said control signals;
   a data channel demodulator for loading said received data signals from said first memory, and demodulating said data signals based on said control signals;
   an accumulator for accumulating said demodulated data signals which have been stored in said first memory; and
   a second memory for holding results of the accumulated demodulated signals; and
   wherein said data channel demodulator re-executes demodulating of previously received signals stored in said first memory if a number of retransmission is less than a predetermined value during a retransmission period,
   wherein said accumulator accumulates the demodulated previously received signals and stores results of the accumulated demodulated previously received signals into said second memory if the number of retransmission is less than said predetermined value during the retransmission period, and
   wherein said accumulator accumulates said demodulated signals from said data channel demodulator and said results of the accumulated demodulated signals from said second memory, and stores said results of the accumulated demodulated signals into said second memory if the number of retransmission is equal to or more than said predetermined value.

2. A wireless communication device according to claim 1, wherein said first memory stores the received signals from a plurality of other wireless communication devices, and wherein said data channel demodulator demodulates the received signals for each one of the other wireless communication devices.

3. A wireless communication device according to claim 1, wherein the first memory is an input memory, and the second memory is a de-interleaver memory.

4. A wireless communication device for a communication system including code-multiplexed data channels and control channels, said device comprising:
   a receiver for receiving signals including data signals sent over the data channels, and control signals sent over control channels, said control signals corresponding to the data signals;
   a control channel demodulator for demodulating said received control signals, said control signals indicating the packet size of said data signals, and extracting information on at least one of the packet size and the modulation method;
   a data demodulator for demodulating said data signals based on the control signals;
   a memory for storing said demodulated data signals as a demodulating status during a demodulating process by said data demodulator, said demodulating process being executed on a basis of the extracted information to select data among results of demodulating,
   wherein partially demodulated results as said demodulating status are stored in said memory during a transmission period, and when retransmission has occurred, said demodulating process is re-executed on the basis of received data which has been previously received; and
   an accumulator,
   wherein the accumulator accumulates the demodulated data signals and stores results of the accumulated demodulated signals into a second memory if a number of retransmission is less than a predetermined value during a retransmission period, and
   wherein the accumulator accumulates said demodulated data signals from said data channel demodulator and said results of the accumulated demodulated signals from the second memory and stores the results of the accumulated demodulated signals into the second memory if the number of retransmission is equal or more than said predetermined value during the retransmission period.

5. A wireless communication device according to claim 4, wherein signal components capable of matching numerous packet sizes are included as said demodulating status.

6. A wireless communication device according to claim 4, wherein I components and Q components of demodulation results for W24 and W12 of Walsh coding are included as said demodulating status.

* * * * *